Aug. 1, 1944.   R. L. BAILEY ET AL   2,354,906
AIRPLANE SCAFFOLD
Filed Oct. 6, 1942   5 Sheets-Sheet 1
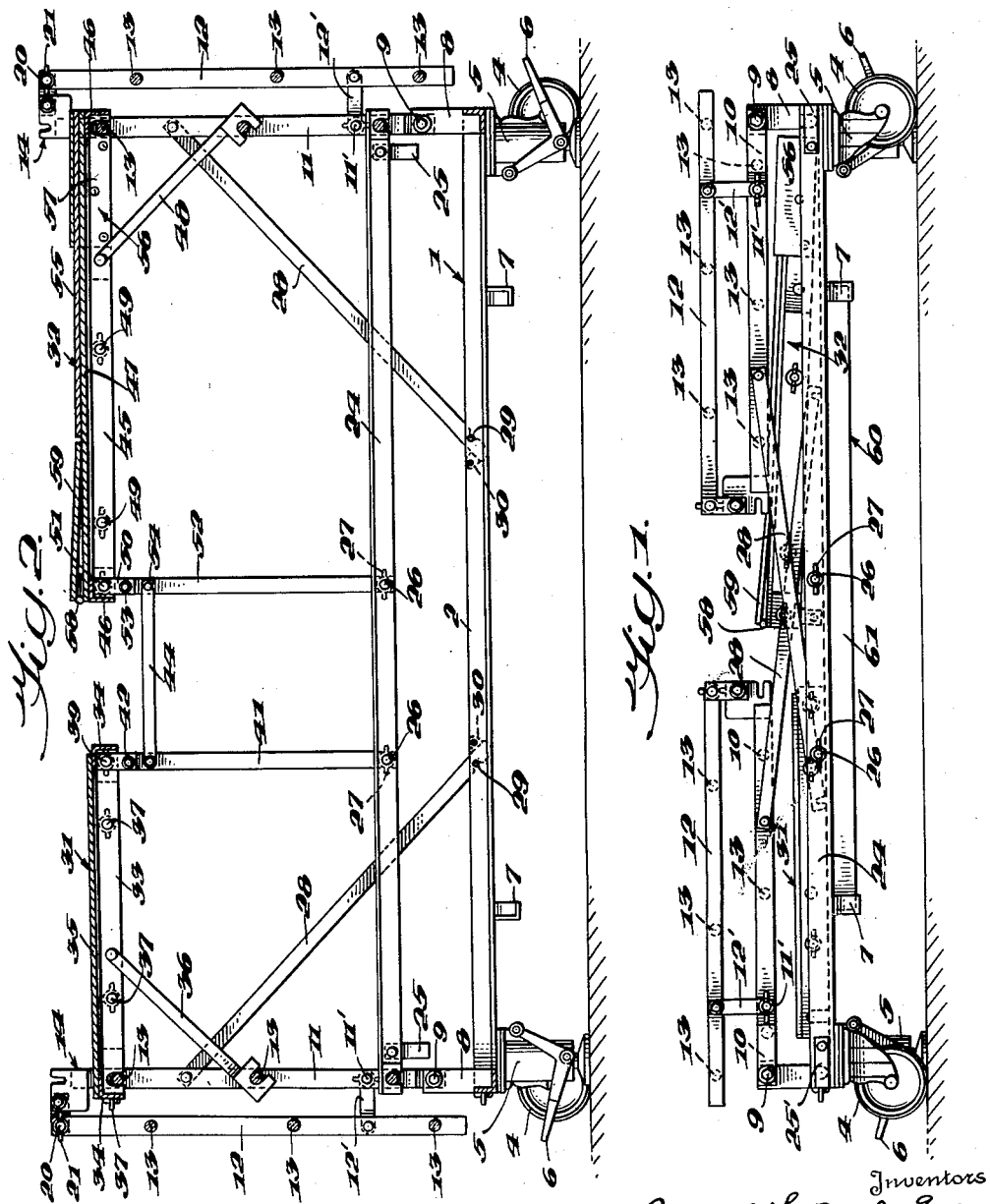
Inventors
Russell L. Bailey and
Leroy J. Hennessy,
By Smith, Michael & Gardiner,
Attorneys.

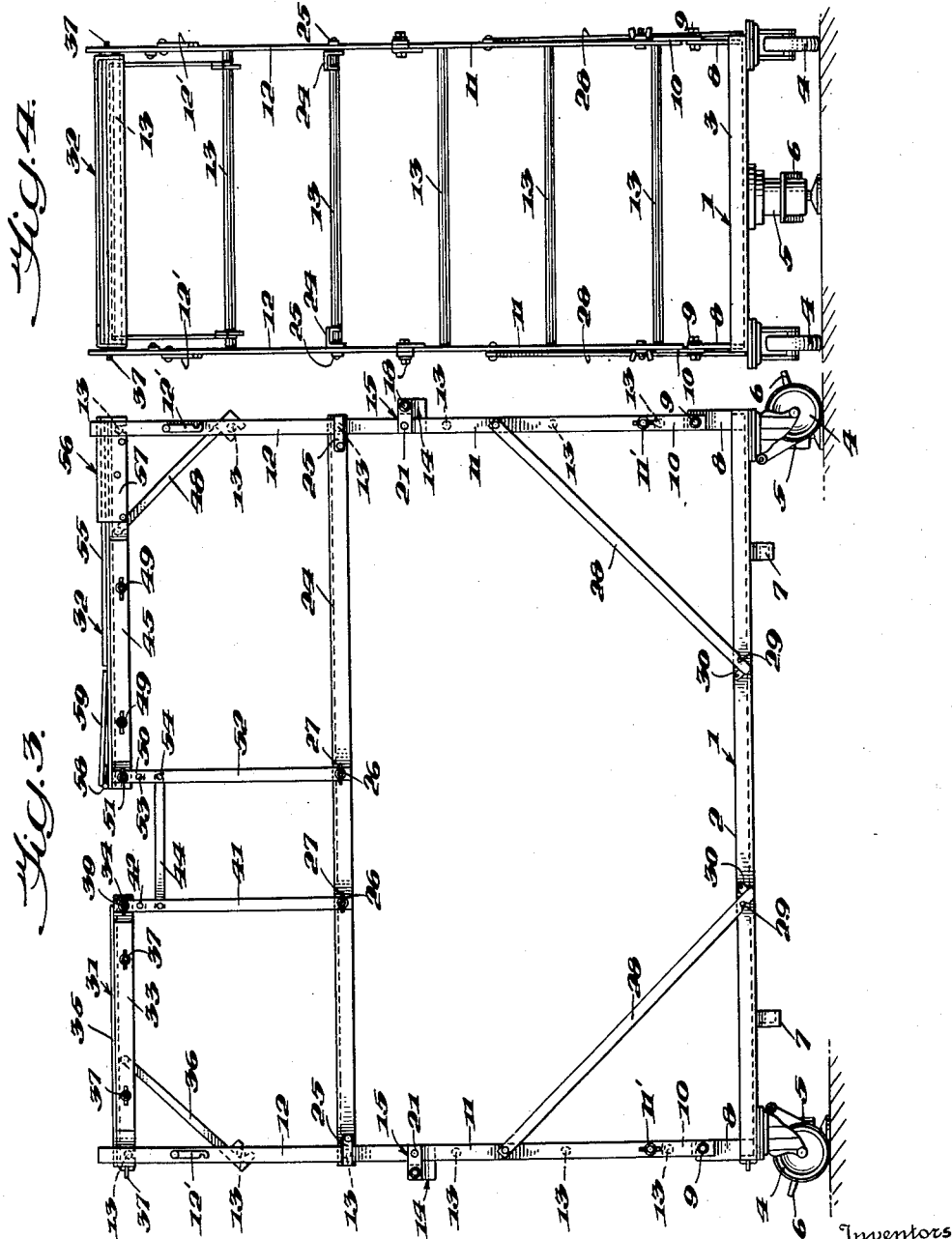

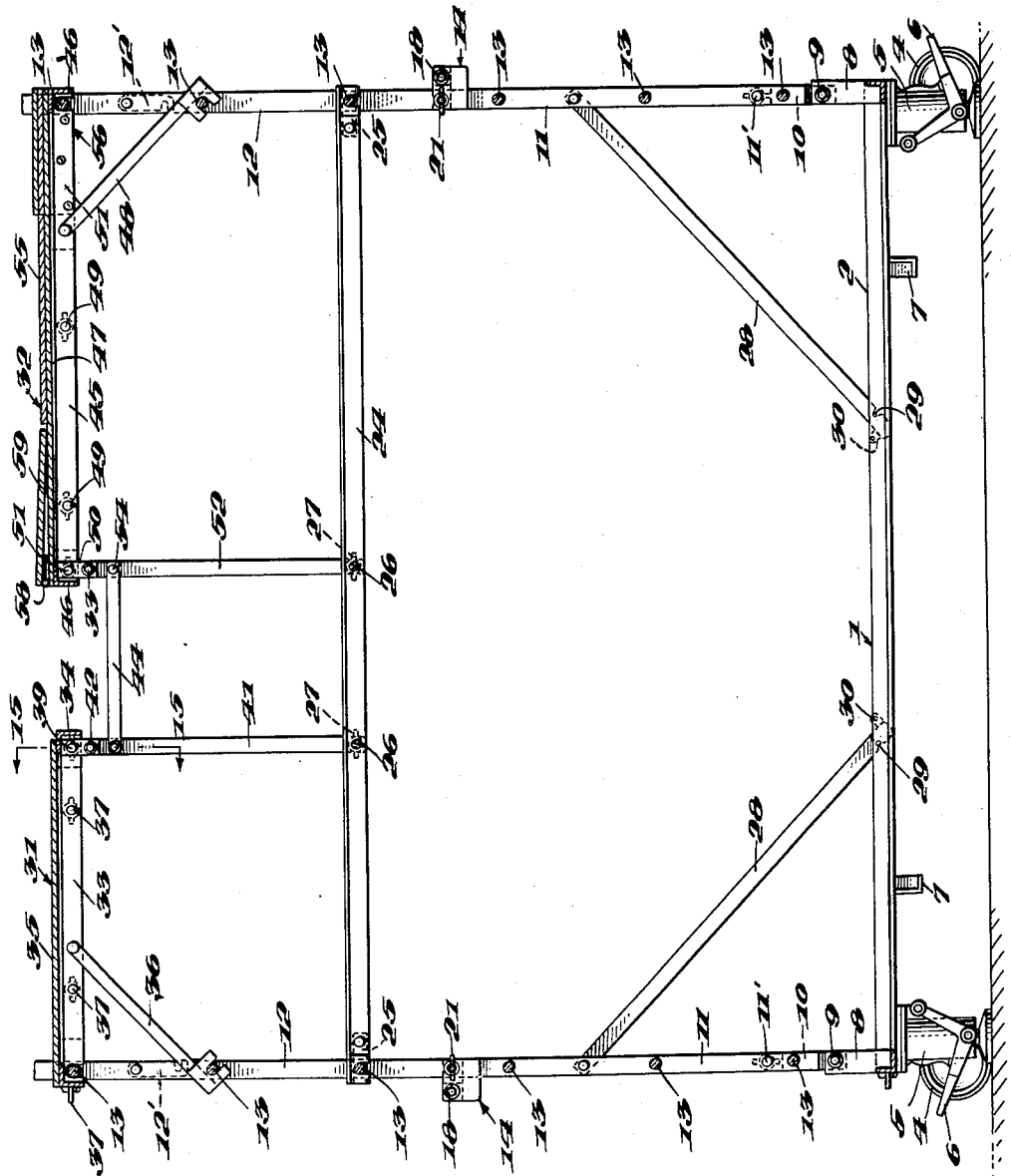

Aug. 1, 1944.  R. L. BAILEY ET AL  2,354,906
AIRPLANE SCAFFOLD
Filed Oct. 6, 1942  5 Sheets-Sheet 4
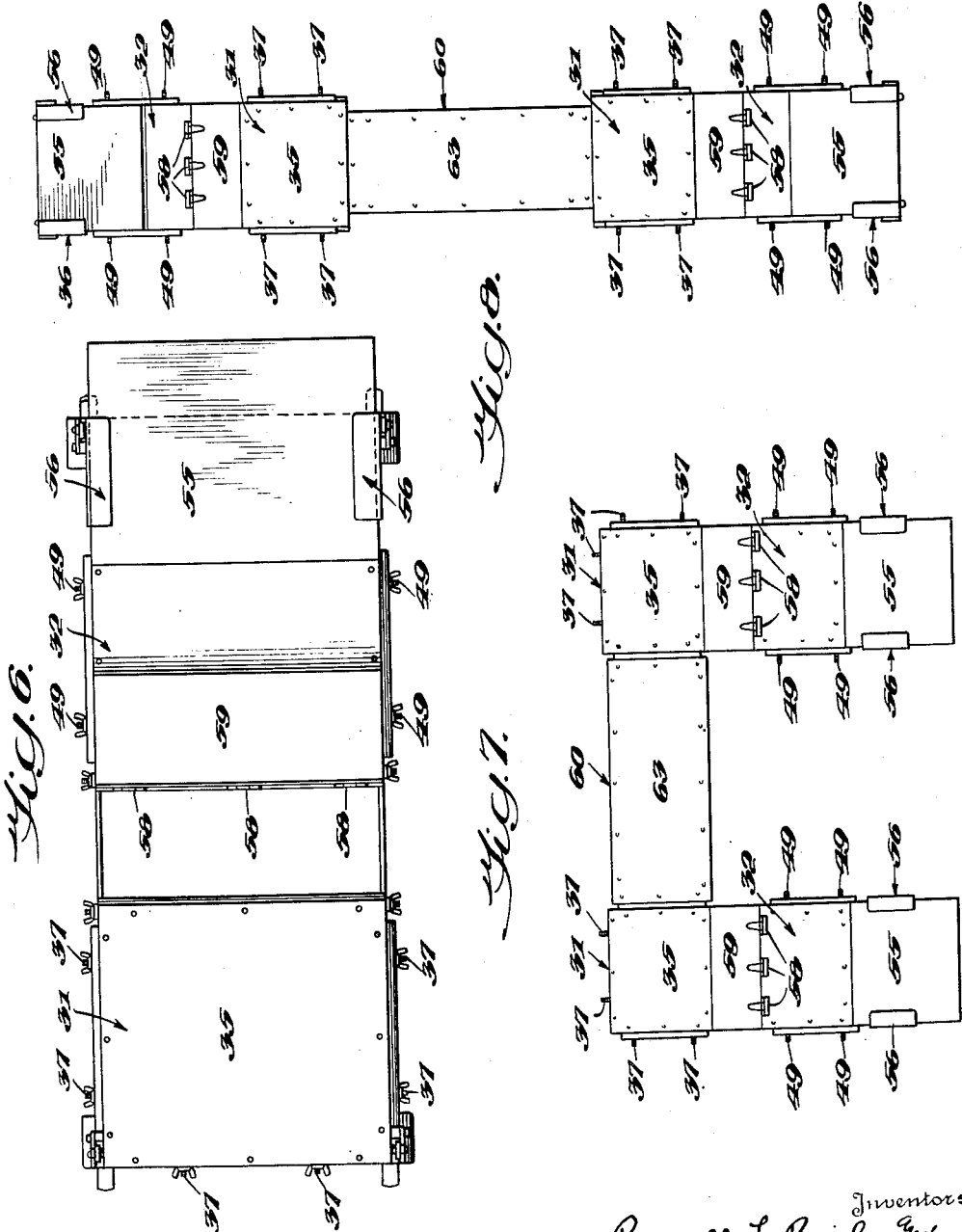

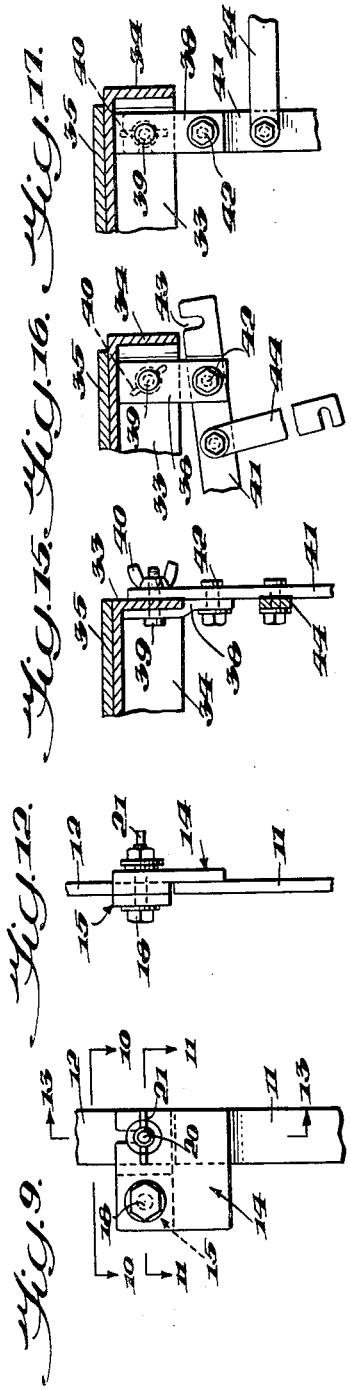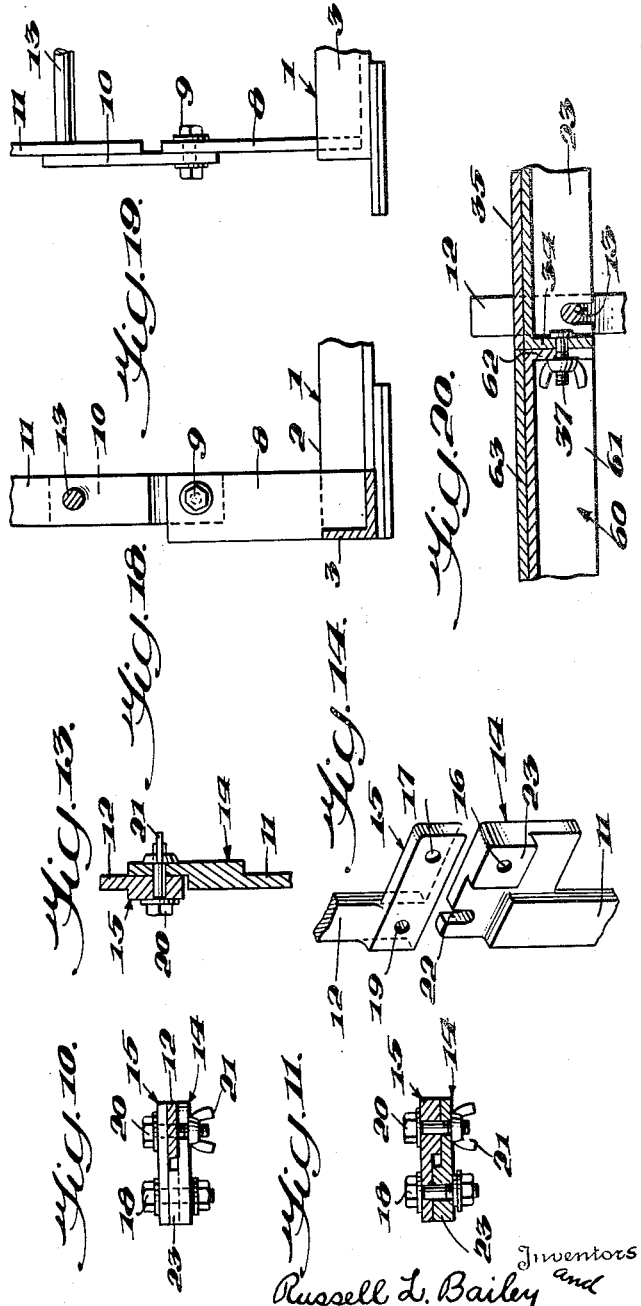

Patented Aug. 1, 1944

2,354,906

UNITED STATES PATENT OFFICE 2,354,906

AIRPLANE SCAFFOLD

Russell L. Bailey, Washington, D. C., and Leroy J. Hennessy, Baltimore, Md.

Application October 6, 1942, Serial No. 460,956

12 Claims. (Cl. 304—3)

This invention relates to scaffolds, and particularly to scaffolds for use in assembling, repairing and "checking" airplanes.

Airplanes, depending upon the make, style, type and size, must be carefully serviced and "checked" after operating a given number of hours in the air. The motor must be tuned, adjusted and repaired and the structural parts of the wings and fuselage, as well as the control surfaces and propellers, must be "checked" at frequent intervals in order to insure future safe flying conditions for the pilot and occupants of the airplane. Under ordinary peace-time conditions, the necessary repair, replacement and "checking" of airplanes is carried out in a hangar, where platforms, ladders, cranes, and other suitable accessories and equipment are readily available to assist the mechanics and ground crew in obtaining access to all parts of the wings, fuselage, motors, propellers, etc. Due, however, to the rapid increase in the number of commercial, military and naval airplanes, suitably located and properly equipped hangars are becoming increasingly scarce, and much of the repair, replacement and "checking" previously performed in hangars, must, of necessity, be performed outside of, or away from, hangars and without the advantages of the usual hangar accessories and equipment.

Also, and of perhaps greater importance, is the maintenance and repair of airplanes engaged in modern warfare. As long as such warplanes are based at a regularly designated airfield where hangar facilities are available, the problem of maintaining and servicing such planes is not a serious one, but when the hangar facilities at the airfield are crowded, as they generally are at present, much of the repair, replacement and "checking" must be performed when the plane is on the ground outside the airfield hangar or hangars and away from the usual hangar accessories and equipment. It frequently becomes necessary for an airplane to land on an emergency landing field or other place where neither hangar nor hangar accessories or equipment are available for the servicing, repair or "checking" of the airplane. Many of the advance bases hastily constructed under wartime conditions are devoid of hangars and/or hangar accessories or equipment, and entirely unsatisfactory make-shift equipment is usually employed to assist the ground crew and mechanics in obtaining access to the various parts of the airplane for repair, replacement and "checking" purposes.

With the above conditions in mind, we have invented and disclose and claim in the present application, a relatively light, compact and efficient scaffold, which may be employed when circumstances demand, to assist the ground crew and mechanics in obtaining access to the wings, fuselage, motors, propellers and control surfaces of an airplane, for the purposes of assembly, repair, replacement and "checking."

It is an object of our present invention to provide a scaffold which, when in its folded or collapsed condition, is relatively small and compact and which may be conveniently stored within, and carried by, an airplane, and which, when occasion demands, may be readily removed from the plane and opened up to its partially or fully extended condition to provide a convenient, strong and durable scaffold for use by members of the crew of the airplane, the ground crew, or mechanics, to assist in gaining access to the motor or motors, the propeller or propellers, the wings, the fuselage or other exterior portions of the airplane, for the purpose of repair, replacement and "checking."

It is an object of our present invention to provide a scaffold of the "unit" type, so constructed and arranged that two or more of such "units" may be attached together to provide a support for ground crew members or mechanics, which will enable said members or mechanics to work on opposite sides of, and in front of, the motor and propeller, or which may be attached together in end-to-end relation to enable the ground crew members or mechanics to work along the entire length or spread of one of the wings of the plane and/or in front of the motors and propellers positioned intermediate the length of the wings.

It is an object of our present invention to provide a scaffold of the "unit" type which is so constructed and arranged that it may be satisfactorily used as an individual or independent airplane scaffold, or which may be assembled in various positions with an airplane scaffold or scaffolds of like "unit" construction, to provide various heights, lengths and shapes of supporting platforms for crew members, ground crew members or mechanics when engaged in airplane repair, replacement or "checking."

It is an object of our present invention to provide an airplane scaffold of the "unit" type primarily intended for use by expeditionary forces, and which includes as a part thereof a continuous supporting platform, an intermediate portion of which is hingedly connected to the remainder of said platform whereby said portion may be folded back upon an adjacent portion of the platform to provide an opening or well into and through which the end portion or portions of an airplane propeller may extend and rotate without interference from the platform or scaffold.

It is a further object of our present invention to provide an airplane scaffold of the "unit" type which includes as a part thereof a supporting platform extending the length of the scaffold and which platform is so constructed and arranged that a portion thereof may be extended beyond the end of the scaffold to increase the over-all length of the platform when occasion demands.

It is a further object of our present invention to provide an airplane scaffold of the "unit" type which includes as a part thereof an auxiliary platform normally housed in the base of the scaffold and which may be attached to a side or end of the main platform of the scaffold to serve as a means for connecting or assembling two or more of the "unit" type scaffolds together in spaced, parallel relation or in spaced, end-to-end relation. By virtue of our "unit" scaffold construction and the provision of one or more auxiliary platforms, it is possible to arrange one or more of the "units" and platforms in various combinations to provide scaffolds of the shape desired to enable the crew members, ground crew members or mechanics to be supported at a convenient height or heights adjacent the various exterior portions of an airplane.

It is a still further object of our present invention to provide an airplane scaffold, preferably of the "unit" type, which can be folded or collapsed so as to occupy a minimum of space and in which all parts necessary for the erection of a complete scaffold are contained within the "unit," including the auxiliary platform which may be used as a means for connecting two or more of the "units" together. The scaffold of our present invention possesses minimum space requirements, is of relatively light weight, may be easily erected and collapsed without the use of tools or special equipment, is strong and durable and is highly efficient in the purpose for which designed.

In the accompanying drawings, wherein for the purpose of illustration we have shown a preferred embodiment of our present invention.

Figure 1 is a side elevation of our airplane scaffold showing the same in collapsed condition, i. e., in the condition in which the scaffold is shipped or is carried within the body of an airplane, Fig. 2 is a vertical secional view of the scaffold showing the same when erected to provide a relatively low platform for crew members and mechanics when assembling, repairing and/or "checking" an airplane, Fig. 3 is a side elevation of the scaffold showing the same when erected to provide a relatively high platform for crew members and mechanics when assembling, repairing and/or "checking" an airplane, Fig. 4 is an end elevation of the scaffold when in the erected condition shown in Fig. 3, Fig. 5 is an enlarged vertical sectional view of the scaffold showing the same when in the erected condition shown in Fig. 3, Fig. 6 is a plan view of the erected scaffold shown in Figs. 2 to 5, inclusive, Fig. 7 is a plan view of two of the "unit" scaffolds of our present invention in which two of the "units" are disposed in spaced, parallel relation and have one end thereof connected by means of an auxiliary platform, Fig. 8 is a plan view of two of the "unit" scaffolds of our present invention in which two of the "units" are disposed in end-to-end relation and have their opposed ends connected by means of an auxiliary platform, and Figs. 9 to 20, inclusive, are fragmentary, sectional, perspective and elevational views of various joints, fastenings and other details of our scaffold construction, Figs. 10, 11 and 13 being sectional views on the lines 10—10, 11—11 and 13—13, respectively, of Fig. 9, and Fig. 15 being a sectional view on the line 15—15 of Fig. 5.

Referring to the accompanying drawings, wherein like reference numerals have been employed to designate like parts throughout the several views, the numeral 1 designates, broadly, the rectangular base frame of the scaffold, which base frame includes parallel side members 2 and parallel end members 3, all of which are preferably L-shaped in transverse cross-section. A supporting wheel or caster 4 is suitably swiveled at each corner of the base frame 1 and serves to support the scaffold when it is being moved into position adjacent an airplane. It will be noted (see Figs. 4 and 19) that the heads of the jacks 5 extend outwardly beyond the vertical side flanges of the side members 2, for a purpose to be hereinafter described. Suitable jacks 5 are secured to the underside of the end members 3 intermediate the wheels or casters 4, these jacks each having a foot-operated lever 6 which, upon depression, transfers the weight of the scaffold unit from the wheels 4 onto the jacks 5. Near each end of the two side members 2, there is secured a depending lug 7 for a purpose to be hereinafter described.

At each of the four corners of the base frame 1 there is welded or otherwise secured, a relatively short, upright member 8, to which is pivotally connected, as by means of a bolt 9, a second relatively short member 10, to the upper portion of which is welded or otherwise secured the lower end of one of the parallel side members 11 of a sectional, ladder-like structure comprising lower parallel side members 11, upper parallel side members 12, and transversely extending rungs 13.

As a convenient means for pivotally connecting the upper and lower sections of the said ladder-like structure, we weld or otherwise secure to the upper end of each lower side section 11 a plate 14, and weld or otherwise secure to the lower end of each upper member 12 a plate 15. The detailed constructions of the plates 14 and 15 are best illustrated in Figs. 9 to 14, inclusive, of the accompanying drawings. Referring specifically to Fig. 14, it will be noted that there is shown therein a pair of plates 14 and 15, secured, respectively, to the upper end of one of the upright side members 11 and to the lower end of one of the side members 12 of the ladder-like structure at the right end of the scaffold as viewed in Fig. 3. The right hand ends of the plates 14 and 15 are apertured at 16 and 17, respectively, and receive therein a threaded bolt 18 which constitutes the pivot, whereby the upper section 12 may be moved into a position above, and in vertical alinement with, the lower section 11, or may be moved into a position alongside, and parallel to, the lower section 11. The end of the plate 15 opposite that in which the aperture 17 is located, is provided with an aperture 19 adapted to receive therein a threaded bolt 20 on which is threaded a wing nut 21. The end of the plate 14 opposite that in which the aperture 16 is located, is provided with a notch 22 into which the bolt 20 passes when the upper section 12 is moved about the pivot bolt 18 to occupy a position in vertical alinement with the lower section 11, it being obvious that when the several parts occupy such position with the bolt 20 resting within the notch 22, the parts can be rigidly clamped in said position by tightening the wing nut 21 on the bolt 20. When the parts are in this position, the lower end of the member 12 rests directly upon the upper end of the member 11, due to the fact that one end of the plate 15 is secured to a side face of the member 12 and that the plate 14 is provided with a thickened corner portion 23.

Each of our "unit" type scaffolds includes a pair of members 24, each of inverted channel-shaped transverse cross-section and each of a length corresponding substantially to the length of the side members 2 of the base frame 1. The depending flanges near each end of the member 24 are provided with alined notches adapted to be placed over one of the rungs 13 of the ladder-like sections at each end of the scaffold. Each member 24 is provided with a pivoted plate 25 adjacent the notches near the outer ends of said member, this plate, when the member 24 is supported by the rungs 13 being movable to a position to engage the outer face of the side member 11 or the side member 12 to rigidly lock the said member 24 to said side members 11 or 12, it being noted from Fig. 4 that when the scaffold is in erected position, the members 24 are disposed closely adjacent the inner sides of the members 11 with the pivoted plates 25 engaging the outer sides of said members. Each of the members 24 is provided with a pair of spaced bolts 26 having wing nuts 27 threaded thereon. It will be understood that the pair of members 24 may be placed over any one of the rungs 13 of either the lower or upper section of the ladder-like structures and that such members serve to maintain the said sections in proper upright and parallel, spaced relation. To assist the members 24 in the performance of their function, we provide diagonally-extending brace rods or bars 28, the upper ends of which are pivotally connected to the side members 11 and the lower ends of which are notched to engage headed bolts 29 mounted on the upright flanges of the side members 2 of the base frame. To retain the lower, notched ends of the brace rods or bars 28 in positive engagement with the headed bolts 29, we provide pivoted latches 30 which are moved into engagement with the top edges of the brace rods or bars 28 and which may be moved out of such engagement when it is desired to remove said rods or bars from engagement with the said headed bolts 29.

The supporting platforms of the scaffold "unit" of our present invention comprise two sections 31 and 32, of which the section 31 is disposed at the left side of the scaffold and the section 32 at the right side thereof as viewed, for example, in Figs. 2, 3 and 5 of the accompanying drawings. The section 31 comprises a substantially square frame including side members 33 and end members 34, each of substantially L-shaped transverse cross section as shown, for example, in Figs. 2, 5, 15, 16 and 17. A cover plate 35 overlies the frame members 33 and 34 and is spot-welded or otherwise secured to the horizontally-extending flanges of said members. Each of the side members 33 is provided near one end thereof with a notch adapted for engagement over one of the rungs 13, whereby one end of the platform section 31 may be supported on a selected rung, and each of said side members has pivotally connected thereto a diagonally-extending brace rod or bar 36, having its upper end pivotally attached to the depending flange of said side member, and having its lower end provided with a plate-like portion having a notch therein adapted to engage a rung 13, the relative length of said brace rod or bar 36 with respect to the vertical distance between the rungs 13 being such that said brace rod or bar will maintain the platform section 31 in a substantially horizontal position when the scaffold is erected. The two side members 33 and the outer end member 34 are each provided with spaced, outwardly projecting bolts 37, for a purpose to be hereinafter described. The inner ends of the side members 33 of the platform section 31 each have secured to the inner face thereof a depending plate 38 having near its upper end an aperture adapted to receive a bolt 39, on the outer end of which is threaded a wing nut 40. Attached to the lower end of said plate 38 is a brace rod or bar 41, pivotally mounted on a bolt 42 which passes through said plate 38 and through said brace rod or bar 41. The upper end of the brace rod or bar 41 is notched as shown at 43 and, when said rod or bar is in its vertical position, said notch 43 passes over the bolt 39 and is rigidly clamped in position by means of the wing nut 40. Pivotally attached to the brace rod or bar, near the upper end thereof, is a bar 44, the outer end of which is notched to engage a headed bolt on an adjacent portion of the scaffold. The lower end of the brace rod or bar 41 is notched or apertured to engage the bolt 26 on member 24 on which bolt it is tightly clamped by means of the wing nut 27. The effective length of the brace rod or bar 41 is substantially equal to the distance between two of the rungs 13. Each of the upper sections 12 of the ladder-like structure has pivoted thereto a latch 12' which has a notched outer or free end adapted to engage a headed bolt when the scaffold is in the position shown in Figs. 1 and 2.

The platform section 32 comprises a substantially rectangular frame including side members 45 and end members 46, each of substantially L-shaped transverse cross-section as shown, for example, in Figs. 2 and 5. A cover plate 47 overlies the frame members 45 and 46, and is spot welded or otherwise secured to the horizontally-extending flanges of said members. Each of the side members 45 is provided near one end thereof with a notch adapted for engagement over one of the rungs 13, whereby one end of the platform section 32 may be supported on a selected rung, and each of said side members has pivotally connected thereto a diagonally-extending brace rod or bar 48, having its upper end pivotally attached to the depending flange of said side member, and having its lower end provided with a plate-like portion having a notch therein adapted to engage a rung 13, the relative length of said brace rod or bar 48 with respect to the vertical distance between the rungs 13 being such that said brace rod or bar will maintain the platform section 32 in a substantially horizontal position when the scaffold is erected. The two side members 45 are each provided with spaced, outwardly projecting bolts 49, for a purpose to be hereinafter described. The inner ends of the side members 45 of the platform section 32 each have secured to the inner face thereof a depending plate 50 having near its upper end an aperture adapted to receive a bolt 51, on the outer end of which is threaded a wing nut. Attached to the lower end of said plate 50 is a brace rod or bar 52, pivotally mounted on a bolt 53 which passes through said plate 50 and through said brace rod or bar 52. The upper end of the brace rod or bar 52 is notched and when said rod or bar is in its vertical position, said notch passes over the bolt 51 and is rigidly clamped in position by means of the wing nut secured on the bolt 51. The detailed construction of the plate 50 and the means for attaching and clamping thereto the brace rod or bar 52, are identical with the mechanism shown in Figs. 15, 16 and 17 and need no further description. Immediately below the bolt 53 is a headed stud 54 adapted for engagement by the hooked or notched end of the bar 44 above described.

The platform section 32 has a plate 55 on the top thereof overlying a portion of the plate 47 and slidable with respect to said plate to increase the overall length of this platform section. L-shaped guide members 56 have their depending portions 57 attached to the outer surface of the depending flange portions 45 of the platform section 32 and have their horizontally extending portions overlying the plate 55, the construction and arrangement being such that the plate 55 can be moved outwardly beyond the end of the cover plate 47 to increase the overall length of the platform section 32. At the inner end of the platform section 32 there is pivotally mounted, by means of hinges 58, a plate 59, which may be moved to cover the space between the inner ends of the platform sections 31 and 32, or which may be moved to a position overlying the space between the inner ends of the platform sections 31 and 32.

In order to permit the attachment of two or more of the "unit" type scaffolds of our present invention, to form various combinations or shapes of work stands, we equip each of the "unit" type scaffolds with an auxiliary platform 60 comprising a rectangular frame including side members 61 and end members 62 preferably of L-shaped transverse cross section. A cover plate 63 is spot welded or otherwise secured to the horizontally-extending flanges of the side and end members 61 and 62, respectively, to constitute the top or supporting surface of the auxiliary platform. The depending flanges of the end members 62 are provided with notches, spaced in accordance with the spacing of the outwardly-extending bolts 37 on the front and side edges of the platform section 31 and the bolts 49 on the side members 45 of the platform section 32. When the auxiliary platform 60 is not in use, it is conveniently stored on the scaffold by supporting said auxiliary platform on the depending lugs 7 secured to the side members 2 of the base frame 1.

Having thus described the preferred construction of our improved airplane scaffold, we will now refer to the operation and use of the same as a means for assisting mechanics in the servicing and "checking" of airplanes. As will be readily apparent from an examination of Fig. 1, the scaffold can be readily collapsed and requires a minimum of space when in such collapsed condition. Hence, the "unit" scaffold may be readily transported and shipped and one or more of said units may be conveniently packed or stored on or within an airplane. When in such collapsed or folded condition, the auxiliary platform 60 is supported on the lugs 7; the two members 24 are supported on the outwardly-extending portions of the heads of the wheels or casters 4 at opposite sides of the base frame 1 and occupy positions adjacent the two side members 2 of said base frame; the two platform sections 31 and 32, with their associated brace rods or bars folded thereagainst, are supported on the base frame 1 and on the auxiliary platform 60; the four diagonal brace rods or bars 28 are crossed on opposite sides of the base frame and occupy positions as shown in Fig. 1; and the two ladder-like sections comprising side members 11 and 12 and rungs 13, are folded down over the top of the collapsed scaffold "unit" with the latch members 12' engaging, and clamped to, the bolts 11'.

When it is desired to use the scaffold as a separate or independent unit, the ladder-like structures at the ends of the base frame are swung upwardly about the bolts 9; the lower ends of the diagonal brace rods or bars 28 are hooked over the headed bolts 29; and the latch members 30 are moved into engagement with the top surfaces of the brace rods or bars 28 to retain the ends of the said brace rods or bars in engagement with said headed bolts. The two members 24 have their opposite notched ends placed over the lowermost rung 13 at opposite ends of the scaffold, and are secured in such positions by means of the latch members 25. The platform section 31 is then removed from its collapsed position on the base frame and is moved to a position wherein the notched outer ends are supported on the third rung of the ladder-like section at the left hand end of the scaffold "unit" as viewed, for example, in Fig. 2; the diagonal brace rods or bars 36 have their lower, notched ends engaged with the second rung of the ladder-like section at the left of the scaffold "unit"; the brace rods or bars 41 are then moved about their pivot bolts 42 to vertical positions wherein the notches 43 engage the bolts 39, and the upper ends of said brace rods or bars are then clamped by means of the wing nuts 40; and the lower apertured or notched ends of said brace rods or bars 41 are then clamped to the members 24 by means of bolts 26 and wing nuts 27. When in this position, the platform section 31 is rigidly secured in position.

The platform section 32 is then removed from its collapsed position on the base frame and is moved to a position wherein its notched outer ends are supported on the third rung of the ladder-like section at the right hand end of the scaffold "unit" as viewed, for example, in Fig. 2; the diagonal brace rods or bars 48 have their lower, notched ends engaged with the second rung of the ladder-like structure at the right of the scaffold "unit"; the brace rods or bars 52 are then moved about their pivot bolts 53 to vertical positions wherein the notches at the upper ends of said brace rods or bars engage the bolts 51, and the upper ends of said brace rods or bars are then clamped by means of the wing nuts associated with said bolts 51; and the lower apertured or notched ends of said brace rods or bars 52 are then clamped to the members 24 by means of bolts 26 and wing nuts 27. When in this position, the platform section 32 is rigidly secured in position. The brace rods or bars 44 are moved to position wherein their outer hooked ends engage the headed bolts 54.

When erected as above described, the parts occupy the positions shown in Fig. 2, i. e., positions wherein the scaffold is adapted for use as a relatively low supporting means for workmen or mechanics to assist them in servicing or "checking" an airplane wherein the motors, propellers, wings, etc., are relatively close to the ground. The scaffold "unit" may be rolled to the desired position adjacent the airplane and when in such position, the foot levers 6 are depressed, whereupon the weight of the scaffold is transferred from the wheels or casters 4 to the jacks 5. If a continuous supporting surface is desired, the plate section 59 is moved about its hinges 58 to bridge the space or well existing between the spaced inner ends of the platform sections 31 and 32. If a longer or more extensive surface than that provided by the sections 31, 32 and 59, is desired, the plate 55 can be projected outwardly beyond the right hand end of the scaffold by sliding the said plate along the plate 47 and beneath the overhanging or horizontal flanges of the member 56. If the scaffold unit is to be used as a means for supporting workmen or mechanics who are working to the front and to the rear of the propeller of an airplane, the plate 59 is moved to a position to overlie the plate 47, the brace rods or bars 44 are unhooked from the bolts 54, and a well is thus provided between the inner ends of the platform sections 31 and 32, into which the propeller may be positioned and into and through which the propeller may be rotated for motor tuning and adjustment purposes, without in any way interfering with or contacting the scaffold.

In the event that the particular airplane to be serviced or "checked" requires a higher supporting surface than that provided by the scaffold "unit" when erected as shown and described in connection with Fig. 2, the latching members 12' are released from their engagement with the bolts 11' and the upper sections of the ladder-like structures at opposite ends of the scaffold are moved about their pivot bolts 18 to positions above and in vertical alinement with the lower sections of the ladder-like structures. During such movement, the slots 22 will engage the bolts 20, and the plates 14 secured to the upper ends of the side sections 11 will be clamped in position by means of the wing nuts 21. The members 24, and platform sections 31 and 32 are then engaged over rungs 13 of the upper sections of the ladder-like structures. In Figs. 3, 4 and 5, we have illustrated the relationship and location of parts when a "high" supporting platform is required. In these figures, the platform sections 31 and 32 engage the uppermost rungs 13 of the ladder-like sections; the diagonal brace rods 36 and 48 engage the rungs 13 immediately below the uppermost rungs of the sections; and the side members 24 engage the rungs 13 immediately below the rungs engaged by the brace rods or bars 36 and 48. When in the erected position shown in Figs. 3, 4 and 5, the plate 59 may be used to cover or uncover the well or space between the inner ends of the platform sections 31 and 32, and, if desired, the plate 55 may be projected from the end of the scaffold to increase the overall length of the supporting surface.

When it is desired to provide a supporting scaffold for workmen or mechanics who desire to work on both sides and in front of the motor of an airplane, two of the scaffold "units" above described may be assembled and connected in the manner illustrated in Fig. 7. To this end, the auxiliary platform 60 of one of the scaffold "units" is removed from its position on the supporting lugs 7. Two of the scaffold "units" are arranged in parallel spaced relation as shown in Fig. 7, and the auxiliary platform 60 is moved to a position where the notches in the depending end flanges of end members 62 pass over the spaced, outwardly projecting bolts 37 on the opposite sides of platform sections 31 of the two "units," whereupon the wing nuts associated with said bolts 37 are tightened to secure the auxiliary platform 60 in position between the two spaced, parallel "units." In this connection, attention is invited to the disclosure of Fig. 20 of the accompanying drawings. It will be understood, of course, that, if desired, the auxiliary platform 60 may be positioned between the sections 32 of the two "units" shown in Fig. 7, in which event the bolts 49 and the wing nuts associated therewith, would be employed to maintain the parts in position. It will also be understood that the arrangement of "units" illustrated in Fig. 7 may be made regardless of whether the platform sections are arranged in their "low" position (Fig. 2) or in their "high" position (Figs. 3, 4 and 5).

When it is desired to provide a supporting scaffold of relatively great length, for example, if it is desired to provide a scaffold to enable workmen or mechanics to work along the full length or a portion of the length or spread of an airplane wing, to repair or replace the de-icing boots along the leading edge of said wing or to perform other services on said wing, two of the scaffold "units" above described may be assembled and connected in the manner illustrated in Fig. 8. To this end the auxiliary platform 60 of one of the scaffold "units" is removed from its position on the supporting lugs 7. Two of the scaffold "units" are arranged in spaced, end-to-end relation as shown in Fig. 8, and the auxiliary platform 60 is moved to a position where the notches in the depending end flanges of end members 62 pass over the spaced outwardly projecting bolts 37 on the opposite ends of the platform sections 31 of the two "units," whereupon the wing nuts associated with said bolts 37 are tightened to secure the auxiliary platform 60 in position between the ends of the two units. It will be readily apparent to one skilled in the art that by virtue of the "unit" construction which we have provided and by means of the auxiliary platform or platforms 60, many and varied platform arrangements and combinations are possible, i. e., a plurality of the "units" and auxiliary platforms can be assembled to provide supporting surfaces of H form, L form, T form, etc., and that this can be done regardless of whether the platform sections are in their "low" or "high" positions.

It is to be understood that the form of our invention shown and described herein is to be taken as a preferred embodiment of the same and that various changes may be made in the shape, size and arrangement of parts without department from the spirit of our present invention or the scope of the subjoined claims.

Having thus described our invention, we claim:

1. An airplane scaffold comprising a horizontal base, a first support pivotally connected at its lower end to said base and movable to positions substantially parallel to or perpendicular to said base, a second support pivotally connected at its lower end to the upper end of said first support and movable to positions in alinement with or parallel to said first support, means for maintaining said first support in its perpendicular position with respect to said base, means for maintaining said second support in alinement with said first support, a platform having one end supported on one of said supports, and means for supporting the opposite end of said platform.

2. An airplane scaffold comprising a horizontal base; a sectional ladder-like support having a lower section pivotally connected to said base and having an upper section pivotally connected to the top of said lower section, said support being movable to positions substantially parallel to or perpendicular to said base, and said upper section of said support being movable to positions in alinement with or parallel to said lower section; means for maintaining said first section in its perpendicular position with respect to said base; means for maintaining said second section in alinement with said first section; a platform having one end supported on one of said sections; and means for supporting the opposite end of said platform.

3. An airplane scaffold comprising a substantially rectangular base; a pair of spaced ladder-like structures pivotally connected to the base at their lower ends near opposite ends of said base and movable to positions substantially parallel to or perpendicular to said base, said ladder-like structures including spaced side members and spaced rungs; means extending between said ladder-like structures and said base for maintaining said ladder-like structures in their perpendicular positions with respect to said base; and a platform supported by the rungs of said ladder-like structures.

4. An airplane scaffold comprising a substantially rectangular base; a pair of spaced ladder-like structures pivotally connected to the base at their lower ends near opposite ends of said base and movable to positions substantially parallel to or perpendicular to said base, said ladder-like structures including spaced side members and spaced rungs; means extending between said ladder-like structures and said base for maintaining said ladder-like structures in their perpendicular positions with respect to said base; a platform having one end supported by one of the rungs of one of said ladder-like structures; and means supported by said ladder-like structures for supporting the opposite end of said platform.

5. An airplane scaffold comprising a substantially rectangular base; a pair of spaced ladder-like structures pivotally connected to the base at their lower ends near opposite ends of said base and movable to positions substantially parallel to or perpendicular to said base, said ladder-like structures including spaced side members and spaced rungs; means for maintaining said ladder-like structures in their perpendicular positions with respect to said base; a platform having one end supported by one of the rungs of one of said ladder-like structures; a bar extending between said ladder-like structures and having its ends supported thereon; and means extending between said bar and the opposite end of said platform for supporting said platform from said bar.

6. An airplane scaffold comprising a substantially rectangular base; a pair of spaced ladder-like structures pivotally connected to the base at their lower ends near opposite ends of said base and movable to positions substantially parallel to or perpendicular to said base, said ladder-like structures including spaced side members and spaced rungs; means for maintaining said ladder-like structures in their perpendicular positions with respect to said base; a platform having notches near its outer end for engagement over one of the rungs of one of said ladder-like structures; a bar extending between said ladder-like structures and having notches near its opposite ends for engagement over one of the rungs of each of said ladder-like structures; and a brace extending from said bar and connected to the inner end of the platform to assist in supporting said platform.

7. An airplane scaffold comprising a rectangular base; a pair of spaced supports pivotally connected to the base at their lower ends near opposite ends of said base and movable to positions substantially parallel to or perpendicular to said base; means for maintaining said supports in their perpendicular positions with respect to said base; a first platform having its outer end connected to one support; a second platform having its outer end connected to the other support; a rod connected to and extending between said supports below said first and second platforms; and braces extending between said bar and the inner ends of said first and second platforms to assist in supporting the same.

8. An airplane scaffold comprising a rectangular base; a pair of spaced supports pivotally connected to the base at their lower ends near opposite ends of said base and movable to positions substantially parallel to or perpendicular to said base; means for maintaining said supports in their perpendicular positions with respect to said base; a first platform having its outer end connected to one support; a second platform extending toward the first platform and having its outer end connected to the other support; the inner ends of said platforms being spaced from each other to provide a well therebetween; and means for supporting the inner ends of said platforms.

9. An airplane scaffold comprising a base; a pair of spaced upright supports mounted on said base; a first platform having its outer end mounted on one of said supports; a second platform having its outer end mounted on the other of said supports and extending toward said first platform and in alinement therewith, the inner ends of said platforms being spaced to provide a well therebetween; and a third platform adapted to selectively open or close the top of said well, said third platform, when in closed position, forming a relatively straight and continuous supporting surface with said first and second platforms.

10. An airplane scaffold of the "unit" type comprising a base; a pair of spaced upright supports; a platform mounted on said supports and having fastening means adjacent its marginal edges at opposite sides thereof; and an auxiliary platform constituting a part of the "unit" and having fastening means adjacent its marginal edges at opposite ends thereof to cooperate with the fastening means on the platform, whereby a plurality of said "units" may be secured together by said fastening means in parallel spaced relation by connecting the same by said auxiliary platform.

11. An airplane scaffold of the "unit" type comprising a base; a pair of spaced upright supports; a platform mounted on said supports and having fastening means adjacent its marginal edge at one end thereof; and an auxiliary platform constituting a part of the "unit" and having fastening means adjacent its marginal edges at opposite ends thereof to cooperate with the fastening means on the platform, whereby a plurality of said "units" may be secured together by sa'd fastening means in end-to-end relation by connecting the same by said auxiliary platform.

12. An airplane scaffold of the "unit" type comprising a base; a pair of spaced upright supports; a platform mounted on said supports and having fastening means adjacent its marginal edges at one end and on two opposite sides thereof; and an auxiliary platform constituting a part of the "unit" and having fastening means adjacent its marginal edges at opposite ends thereof to cooperate with the fastening means on the end or sides of the platform, whereby a plurality of said "units" may be secured together by said fastening means in parallel spaced relation by connecting the same by attachment of the auxiliary platform to the fastening means adjacent the sides of two spaced "units" or whereby a plurality of said "units" may be secured together by said fastening means in end-to-end relation by connecting the same by attachment of the auxil'ary platform to the fastening means adjacent the ends of two spaced "units."

RUSSELL L. BAILEY.
LEROY J. HENNESSY.